United States Patent
Yu et al.

(10) Patent No.: US 8,710,818 B2
(45) Date of Patent: Apr. 29, 2014

(54) POWER CONVERTER AND METHOD OF POWER CONVERSION

(75) Inventors: Jin-Hyuck Yu, Hwaseong-si (KR); Dong-Jin Keum, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 314 days.

(21) Appl. No.: 13/161,526

(22) Filed: Jun. 16, 2011

(65) Prior Publication Data
US 2011/0309815 A1    Dec. 22, 2011

(30) Foreign Application Priority Data
Jun. 17, 2010    (KR) .................. 10-2010-0057608

(51) Int. Cl.
    *H02M 3/156*    (2006.01)
(52) U.S. Cl.
    USPC ............................. 323/285; 323/284
(58) Field of Classification Search
    USPC ............................. 323/282, 284, 285
    See application file for complete search history.

(56) References Cited

U.S. PATENT DOCUMENTS

| | | | | |
|---|---|---|---|---|
| 4,837,495 | A * | 6/1989 | Zansky | 323/222 |
| 7,425,819 | B2 * | 9/2008 | Isobe | 323/222 |
| 8,207,713 | B2 * | 6/2012 | Sugawara | 323/222 |
| 2005/0258814 | A1 * | 11/2005 | Chen et al. | 323/285 |
| 2006/0043953 | A1 * | 3/2006 | Xu | 323/282 |
| 2008/0197828 | A1 | 8/2008 | Michishita | |
| 2009/0218999 | A1 * | 9/2009 | Kikuchi | 323/282 |

FOREIGN PATENT DOCUMENTS

| | | |
|---|---|---|
| JP | 2005-057898 | 3/2005 |
| JP | 2008-141845 | 6/2008 |
| JP | 2008-206214 | 9/2008 |
| KR | 1020080076831 | 8/2008 |

* cited by examiner

*Primary Examiner* — Harry Behm
(74) *Attorney, Agent, or Firm* — Volentine & Whitt, PLLC (57) ABSTRACT

A power converter includes a power converting unit and a driving circuit. The power converting unit generates a DC output voltage based on a pull up driving signal, a pull down driving signal, and a DC input voltage. The driving circuit compensates for an inductor peak current, and performs in a pulse-frequency-modulation (PFM) mode and a pulse-width-modulation (PWM) mode to generate the pull-up driving signal and the pull-down driving signal based on the DC output voltage and the compensated inductor peak current. The power converter performs a mode transition between the PFM and PWM modes at a uniform load current, even when a magnitude of the DC output voltage varies.

17 Claims, 11 Drawing Sheets

POWER CONVERTER AND METHOD OF POWER CONVERSION

CROSS-REFERENCE TO RELATED APPLICATION

A claim of priority under 35 U.S.C. §119 is made to Korean Patent Application No. 10-2010-0057608 filed, on Jun. 17, 2010, the disclosure of which is hereby incorporated by reference in its entirety.

BACKGROUND

The inventive concepts described herein are generally related to power converters that compensate for inductor peak current, and a corresponding method of power conversion.

Due to environmental concerns, saving energy is a necessary requirement. In mobile information processing devices such as cellular phones and personal digital assistants which use batteries, power saving becomes an important issue. Switch-mode power supplies such as step-down converters, boost converters, and buck-boost converters have been used in various electronic devices, and may be switchable between a pulse-frequency-modulation mode and a pulse-width-modulation mode. However, if a magnitude of the DC output voltage (Vout) of the converters changes, the magnitude of the load current may change when the converters are switched between the pulse-frequency-modulation mode and the pulse-width-modulation mode. Accordingly, there is a need to provide a technique for switching between a pulse-frequency-modulation mode and a pulse-width-modulation mode with uniform load current, even in the event that the magnitude of the DC output voltage of the converter changes. There is also a need to provide peak current compensation.

SUMMARY

Example embodiments of the inventive concept provide a power converter that compensates for an inductor peak current and performs a mode transition between a pulse-frequency-modulation (PFM) and a pulse-width-modulation (PWM) at a uniform load current, even when a magnitude of the DC output voltage varies.

Example embodiments of the inventive concept also provide a method of power conversion that compensates for an inductor peak current and performs a mode transition between PFM and PWM at a uniform load current, even when a magnitude of the DC output voltage varies.

The technical objectives of the inventive concept are not limited to the above disclosure; other objectives may become apparent to those of ordinary skill in the art based on the following descriptions.

In accordance with an aspect of the inventive concept, a power converter includes a power converting unit and a driving circuit.

The power converting unit generates a DC output voltage based on a pull-up driving signal, a pull-down driving signal and a DC input voltage. The driving circuit compensates for an inductor peak current, and performs PFM and PWM to generate the pull-up driving signal and the pull-down driving signal based on the DC output voltage and the compensated inductor peak current.

In some example embodiments, the power converter may operate in the PFM mode when the inductor peak current is lower than a first current value, and operate in the PWM mode when the inductor peak current is higher than the first current value.

In some example embodiments, the driving circuit may perform switching between the PFM mode and the PWM mode at a uniform load current, although a magnitude of the DC output voltage varies.

In some example embodiments, the load current at which switching between the PFM mode and the PWM mode is performed may maintain a distribution lower than 5%, even when the magnitude of the DC output voltage varies.

In some example embodiments, the driving circuit may include a comparator, a current sensor and a switch-driving-signal generator.

The comparator compares the DC output voltage with a reference voltage to generate a first detection voltage signal. The current sensor compensates for the inductor peak current and detects the compensated inductor peak current to generate a current-sensing output signal. The switch-driving-signal generator performs PFM or PWM based on the first detection voltage signal and the current-sensing output signal to generate the pull-up driving signal and the pull-down driving signal.

In some example embodiments, the current sensor may include a peak-current compensating circuit that compensates for the inductor peak current.

In some example embodiments, the power converter may further include a zero-current detecting circuit that compares a voltage signal of a sensing node and a ground voltage to generate a zero-current detecting signal in response to the first detection voltage signal, and that provides the zero-current detecting signal to the switch-driving-signal generator.

In some example embodiments, the zero-current detecting circuit may determine a time point at which a pull-up transistor of the power converting unit is turned on.

In some embodiments, the zero-current detecting circuit may determine a time point at which a pull-down transistor of the power converting unit is turned off.

In some embodiments, the switch-driving signal generator may include a delay circuit, a clock generator, a first OR circuit, a second OR circuit, a latch circuit, an NOR circuit, an inverter, a first driver and a second driver.

The delay circuit delays the first detection voltage signal, and the clock generator generates a clock signal based on the zero-current detecting signal. The first OR circuit performs a logical OR operation on an output signal of the delay circuit and the clock signal. The second OR circuit performs a logical OR operation on the first detection voltage signal and the current-sensing output signal. The latch circuit latches an output signal of the first OR circuit and an output signal of the second OR circuit. The NOR circuit performs a logical NOR operation on an output signal of the latch circuit and the zero-current detecting signal. The inverter inverts a phase of the output signal of the latch circuit. The first driver generates the pull-up driving signal in response to an output signal of the inverter. The second driver generates the pull-down driving signal in response to an output signal of the NOR circuit.

In some example embodiments, the power converting unit may include a first PMOS transistor, a first NMOS transistor, a second PMOS transistor, an inductor and a capacitor.

The first PMOS transistor has a source to which the DC input voltage is applied, a gate to which the pull-up driving signal is applied, and a drain connected to a sensing node. The first NMOS transistor has a drain connected to the sensing node, a gate to which the pull-down driving signal is applied, and a source connected to a ground. The second PMOS transistor has a source to which the DC input voltage is applied, a gate to which the pull-up driving signal is applied, and a drain from which a first sensing current is output. The inductor is coupled between the sensing node and an output node, and the capacitor is coupled between the output node and the ground.

In some example embodiments, a second sensing current may be output from the sensing node.

In some example embodiments, the current sensor may include a peak-current sensor, a peak-current compensating circuit and a buffer circuit.

The peak-current sensor generates a first peak-current detecting signal based on the first sensing current and a second sensing current output from the sensing node. The peak-current compensating circuit subtracts a peak-current compensating signal from the first peak-current detecting signal to generate a second peak-current detecting signal in response to a control signal. The buffer circuit generates the current-sensing output signal based on the second peak-current detecting signal.

In some example embodiments, a plurality of bits of the control signal may be generated based on a voltage level of the DC output voltage.

In some example embodiments, the peak-current compensating circuit may include a plurality of transistors coupled between an output node of the peak-current sensor and the ground, which perform a switching operation in response to the control signal having a plurality of bits.

In some example embodiments, the peak-current compensating circuit may include a plurality of current paths, and each of the current paths may include a first MOS transistor and a second MOS transistor.

The first MOS transistor has a source connected to the ground and a gate to which a bias voltage is applied. The second MOS transistor has a drain connected to an output node of the peak-current sensor, a gate to which one bit of a plurality of bits the control signal is applied, and a source connected to a drain of the first MOS transistor.

In accordance with another example embodiment of the inventive concept, a method of power conversion may include generating a DC output voltage based on a pull-up driving signal, a pull-down driving signal and a DC input voltage; compensating for an inductor peak current; and performing PFM and PWM to generate the pull-up driving signal and the pull-down driving signal based on the DC output voltage and the compensated inductor peak current.

In some example embodiments, the method may further include comparing the DC output voltage with a reference voltage to generate a first detection voltage signal, and adjusting an offset voltage of a zero-current detecting circuit in response to the first detection voltage signal to generate a zero-current detecting signal.

A driving circuit of a power converter in accordance with example embodiments of the inventive concept includes a current sensor for compensating inductor peak current. Therefore, the driving circuit may perform mode transition between PFM and PWM at a uniform load current, even when a magnitude of a DC output voltage varies. Accordingly, a power converter in accordance with example embodiments of the inventive concept may have high power conversion efficiency.

BRIEF DESCRIPTION OF THE DRAWINGS

The accompanying drawings are included to provide a further understanding of the embodiments of the inventive concept, in which like numbers refer to like elements throughout the description. The drawings are not necessarily to scale, emphasis instead being placed upon illustrating the principles of the inventive concept. In the drawings.

DETAILED DESCRIPTION OF THE EMBODIMENTS

Various embodiments will now be described more fully with reference to the accompanying drawings in which some embodiments are shown. These inventive concepts may, however, be embodied in different forms and should not be construed as limited to the embodiments set forth herein. Rather, these embodiments are provided so that this disclosure is thorough and complete and fully conveys the inventive concept to those skilled in the art. In the drawings, the sizes and relative sizes of layers and regions may be exaggerated for clarity.

It will be understood that when an element or layer is referred to as being "on," "connected to" or "coupled with" another element or layer, it can be directly on, connected or coupled with the other element or layer or intervening elements or layers may be present. In contrast, when an element is referred to as being "directly on," "directly connected to" or "directly coupled with" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-sectional illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
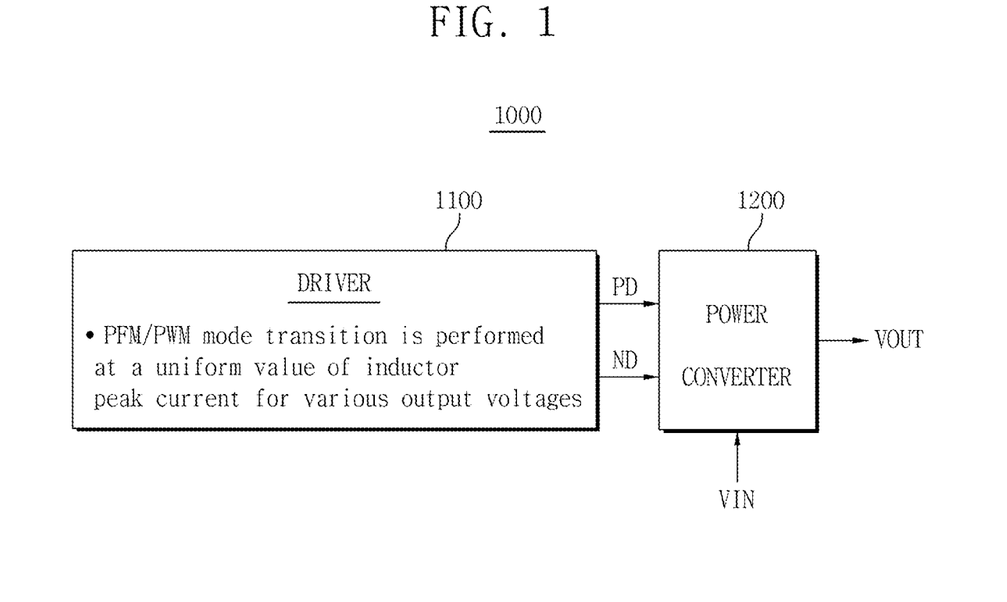
FIG. 1 is a circuit diagram illustrating a power converter in accordance with example embodiments of the inventive concept.

FIG. 1 is a circuit diagram illustrating a power converter 1000 in accordance with example embodiments of the inventive concept.

Referring to FIG. 1, the power converter 1000 includes a driving circuit 1100 and a power converting unit 1200. The power converting unit 1200 generates a DC output voltage VOUT based on a pull-up driving signal PD, a pull-down driving signal ND and a DC input voltage VIN. The driving circuit 1100 compensates for an inductor peak current, and performs a pulse-frequency-modulation (PFM) and a pulse-width-modulation (PWM) to generate the pull-up driving signal PD and the pull-down driving signal ND, based on the DC output voltage VOUT and the compensated inductor peak current.

The power converter 1000 may operate in the PFM mode when the inductor peak current is lower than a first current value, and may operate in the PWM mode when the inductor peak current is higher than the first current value. The driving circuit 1100 may perform mode transition between the PFM mode and the PWM mode at a uniform load current, even when a magnitude of the DC output voltage VOUT varies.

Further, the power converter 1000 may also operate in the PFM mode when the inductor peak current is lower than the first current value, and operate in the PWM mode when the inductor peak current is higher than a second current value that is larger than the first current value.

Figure 2:
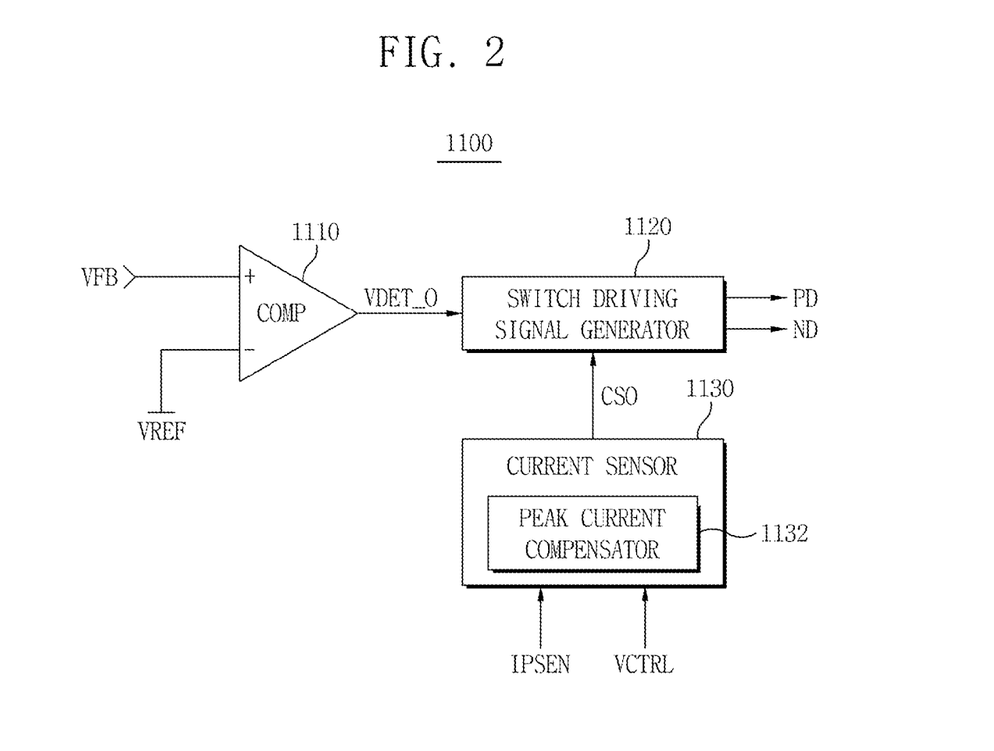
FIG. 2 is a circuit diagram illustrating a driving circuit of the power converter of FIG. 1, in accordance with an example embodiment of the inventive concept.

FIG. 2 is a circuit diagram illustrating an example of a driving circuit 1100 of the power converter of FIG. 1.

Referring to FIG. 2, the driving circuit 1100 includes a comparator 1110, a switch-driving signal generator 1120 and a current sensor 1130. The comparator 1110 compares a feedback voltage VFB corresponding to the DC output voltage VOUT with a reference voltage VREF, to generate a first detection voltage signal VDET_O. The current sensor 1130 compensates for the inductor peak current and detects the compensated inductor peak current to generate a current-sensing output signal CSO based on the sensing current IPSEN and a control signal VCTRL. The switch-driving signal generator 1120 performs the pulse-frequency-modulation (PFM) or the pulse-width-modulation (PWM) based on the first detection voltage signal VDET_O and the current-sensing output signal CSO, to generate the pull-up driving signal PD and the pull-down driving signal ND. The current sensor 1130 may include a peak-current compensating circuit 1132 that compensates for the inductor peak current.

Figure 3:
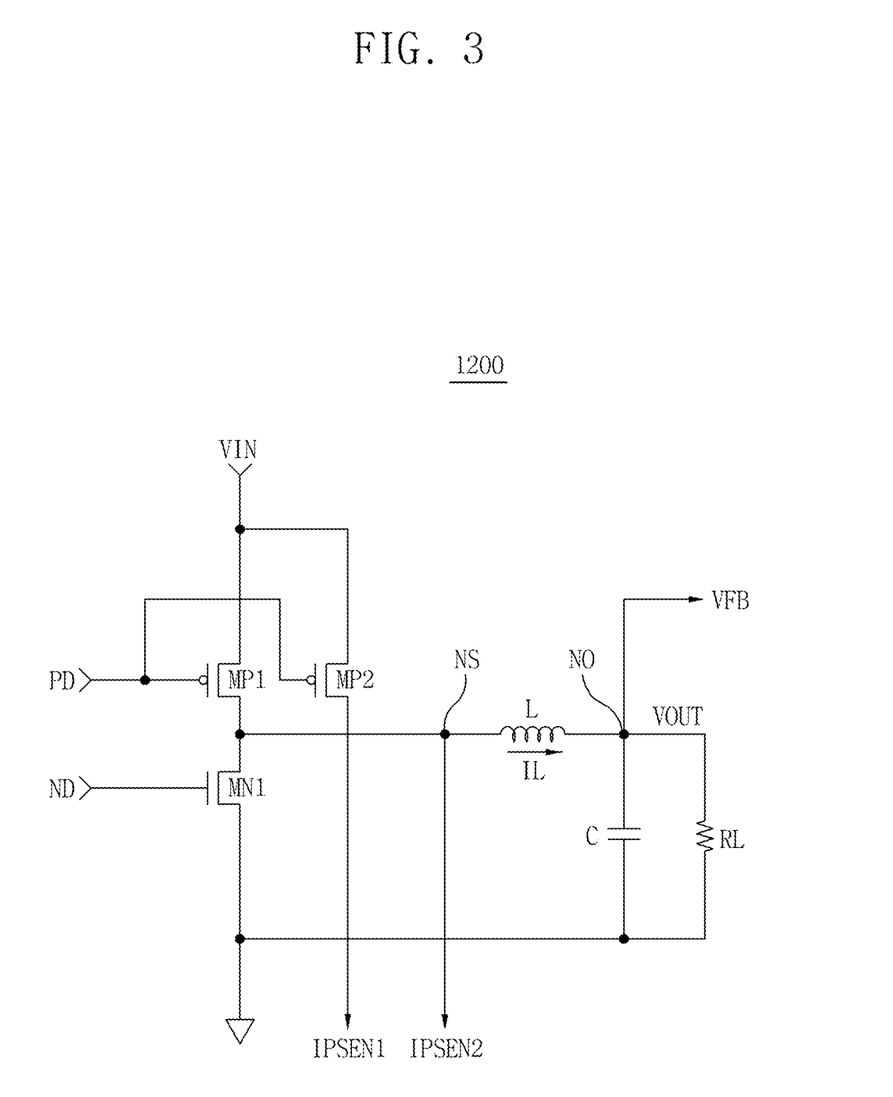
FIG. 3 is a circuit diagram illustrating a power converting unit of the power converter of FIG. 1, in accordance with an example embodiment of the inventive concept.

FIG. 3 is a circuit diagram illustrating a power converting unit 1200 of the power converter of FIG. 1, in accordance with an example embodiment of the inventive concept.

Referring to FIG. 3, the power converting unit 1200 may include a first PMOS transistor MP1, a first NMOS transistor MN1, a second PMOS transistor MP2, an inductor L and a capacitor C. The first PMOS transistor MP1 has a source to which the DC input voltage VIN is applied, a gate to which the pull-up driving signal PD is applied, and a drain connected to a sensing node NS. The first NMOS transistor MN1 has a drain connected to the sensing node NS, a gate to which the pull-down driving signal ND is applied, and a source connected to a ground. The second PMOS transistor MP2 has a source to which the DC input voltage VIN is applied, a gate to which the pull-up driving signal PD is applied, and a drain from which a first sensing current IPSEN1 is output. The inductor L is coupled between the sensing node NS and an output node NO, and the capacitor C is coupled between the output node NO and the ground. A second sensing current IPSEN2 may be output from the sensing node NS, which is a connecting point of the first PMOS transistor MP1 and the first NMOS transistor MN1. A load resistor RL may be coupled with the output node NO.

Figure 4:
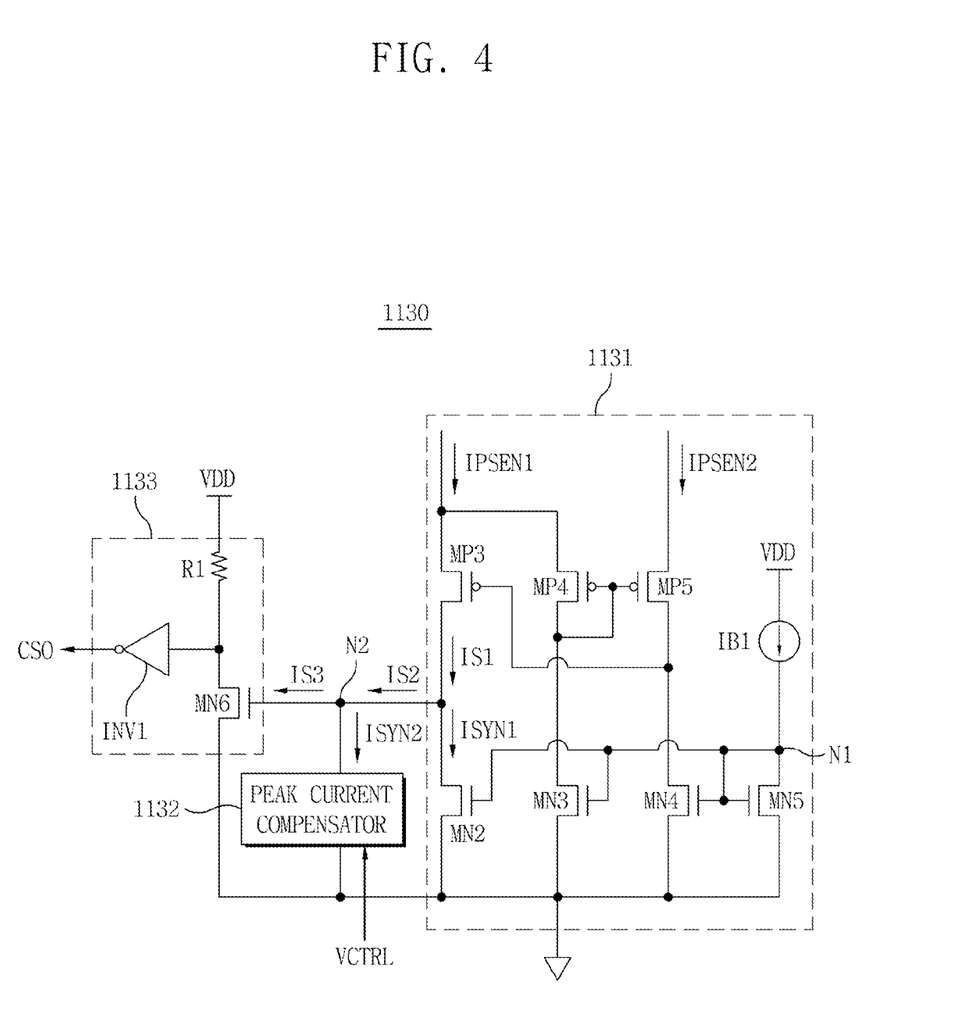
FIG. 4 is a circuit diagram illustrating a current sensor included in the driver circuit of FIG. 2, in accordance with an example embodiment of the inventive concept.

FIG. 4 is a circuit diagram illustrating a current sensor 1130 included in the driver circuit 1100 of FIG. 2, in accordance with an example embodiment of the inventive concept.

Referring to FIG. 4, the current sensor 1130 may include a peak-current sensor 1131, a peak-current compensating circuit 1132 and a buffer circuit 1133. The peak-current sensor 1131 generates a first peak-current detecting signal IS2 based on the first sensing current IPSEN1, and a second sensing current IPSEN2 output from the sensing node NS. The peak-current compensating circuit 1132 subtracts a peak-current compensating signal ISYN2 from the first peak-current detecting signal IS2 to generate a second peak-current detecting signal IS3 in response to a control signal VCTRL. The buffer circuit 1133 generates the current-sensing output signal CSO based on the second peak-current detecting signal IS3.

The peak-current sensor 1131 may include a third PMOS transistor MP3, a fourth PMOS transistor MP4, a fifth PMOS transistor MP5, a second NMOS transistor MN2, a third NMOS transistor MN3, a fourth NMOS transistor MN4, a fifth NMOS transistor MN5 and a current source IB1.

The current source IB1 is coupled between a supply voltage VDD and a first node N1. The fifth NMOS transistor MN5 has a drain connected to the first node N1, and has a structure of diode connection. The fourth NMOS transistor MN4 and the fifth NMOS transistor MN5 are coupled with each other in the form of a current mirror. Further, each of the second NMOS transistor MN2 and the third NMOS transistor MN3 are coupled with the fifth NMOS transistor MN5 in the form of a current mirror. The first sensing current IPSEN1 is applied to a source of each of the third PMOS transistor MP3 and the fourth PMOS transistor MP4, and the second sensing current IPSEN2 is applied to a source of the fifth PMOS transistor MP5. A drain of the third NMOS transistor MN3 and a drain of the fourth PMOS transistor MP4 are connected to each other, and a drain of the fourth NMOS transistor MN4 and a drain of the fifth PMOS transistor MP5 are connected to each other. A gate of the third PMOS transistor MP3 is connected to a drain of the fifth PMOS transistor MP5, and a drain of the third PMOS transistor MP3 is connected to the second node N2. A drain of the second NMOS transistor MN2 is connected to the second node N2, and the peak-current compensating circuit 1132 is coupled with the second node N2 and the ground.

The buffer circuit 1133 may include a resistor R1, an inverter INV1 and a sixth NMOS transistor MN6. The sixth NMOS transistor MN6 has a source connected to the ground and a gate connected to the second node N2. The resistor R1 is coupled between the supply voltage VDD and a drain of the sixth NMOS transistor MN6. The inverter INV1 inverts a phase of a voltage signal of a drain of the sixth NMOS transistor MN6 to generate the current-sensing output signal CSO.

Figure 5:
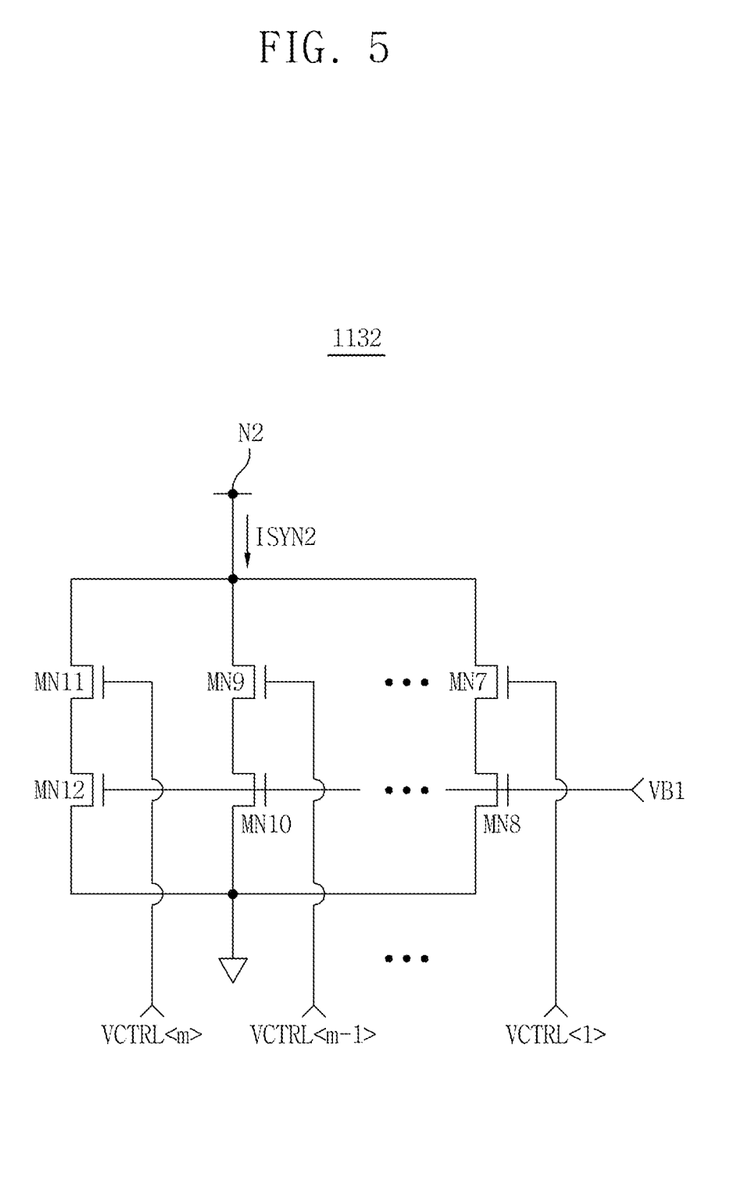
FIG. 5 is a circuit diagram illustrating a peak-current compensating circuit included in the current sensor of FIG. 4, in accordance with an example embodiment of the inventive concept.

FIG. 5 is a circuit diagram illustrating a peak-current compensating circuit 1132 included in the current sensor 1130 of FIG. 4, in accordance with an example embodiment of the inventive concept.

Referring to FIG. 5, the peak-current compensating circuit 1132 may include a plurality of current paths coupled between the second node N2, which is an output node of the peak-current sensor 1131 of FIG. 4, and the ground. Each of the current paths performs a switching operation in response to the control signal VCTRL which has a plurality of bits.

For example, a first current path includes a seventh NMOS transistor MN7 to which a first bit VCTRL<1> of the control signal VCTRL is applied and an eighth NMOS transistor MN8 to which a bias voltage VB1 is applied. An $m^{th}$ current path includes an eleventh NMOS transistor MN11 to which an $m^{th}$ bit VCTRL<m> of the control signal VCTRL is applied and a twelfth NMOS transistor MN12 to which the bias voltage VB1 is applied. The plurality of bits of the control signal VCTRL may be generated based on a voltage level of the DC output voltage VOUT.

Hereinafter, the operation of the current sensor 1130 and the operation of the power converter 1200 in conjunction with the current sensor 1130 will be described referring to FIGS. 1 through 5.

Referring to FIG. 3, the first sensing current IPSEN1 is a sensed current of a current flowing through the second PMOS transistor MP2 that performs a pull-up operation, and the second sensing current IPSEN2 is a current flowing through the first PMOS transistor MP1 subtracted by a current IL flowing through the inductor L. Therefore, as the inductor current IL increases, the second sensing current IPSEN2 decreases accordingly.

Referring to FIG. 4, the first sensing current IPSEN1 is applied to the sources of the third PMOS transistor MP3 and the fourth PMOS transistor MP4, and the second sensing current IPSEN2 is applied to the source of the fifth PMOS transistor MP5. As the inductor current IL increases, a current IS1 flowing through the third PMOS transistor MP3 increases accordingly.

The first peak-current detecting signal IS2 is the current IS1 flowing through the third PMOS transistor MP3 minus the current ISYN1 flowing through the second NMOS transistor MN2. Since the second NMOS transistor MN2 is coupled with the fifth NMOS transistor MN5 in the form of a current-mirror, the current ISYN1 flowing through the second NMOS transistor MN2 may have a constant magnitude.

As shown in FIG. 5, the magnitude of the peak-current compensating signal ISYN2 may vary in response to the control signal VCTRL having a plurality of bits. For example, when a voltage level of the DC output voltage VOUT is high, the current sensor 1130 increases a magnitude of the peak-current compensating signal ISYN2 by increasing the number of current paths that are turned on among the current paths constructing the peak-current compensating circuit 1132. Further, when a voltage level of the DC output voltage VOUT is low, the current sensor 1130 decreases a magnitude of the peak-current compensating signal ISYN2 by decreasing the number of current paths that are turned on among the current paths constructing the peak-current compensating circuit 1132.

The positive slope of the inductor current IL may be expressed as (VIN−VOUT)/L. Therefore, a slope of the inductor current IL decreases when a voltage level of the DC output voltage VOUT increases, whereas a slope of the inductor current IL increases when a voltage level of the DC output voltage VOUT decreases.

The second peak-current detecting signal IS3 is a signal generated by subtracting the peak-current compensating signal ISYN2 from the first peak-current detecting signal IS2. Therefore, when a voltage level of the DC output voltage VOUT is high, the magnitude of the second peak-current detecting signal IS3 may decrease because the magnitude of the peak-current compensating signal ISYN2 increases. On the contrary, when a voltage level of the DC output voltage VOUT is low, the magnitude of the second peak-current detecting signal IS3 may increase because the magnitude of the peak-current compensating signal ISYN2 decreases.

The buffer circuit 1133 buffers the second peak-current detecting signal IS3 and generates the current-sensing output signal CSO. Therefore, the magnitude of the current-sensing output signal CSO increases when the second peak-current detecting signal IS3 increases, whereas the magnitude of the current-sensing output signal CSO decreases when the second peak-current detecting signal IS3 decreases.

Accordingly, the magnitude of the inductor peak current for enabling the current-sensing output signal CSO increases when a voltage level of the DC output voltage VOUT is high. On the contrary, the magnitude of the inductor peak current for enabling the current-sensing output signal CSO decreases when a voltage level of the DC output voltage VOUT is low. When the current-sensing output signal CSO is enabled, a PMOS switching transistor, e.g. MP1 in FIG. 3, is turned off and the inductor current IL may have a negative slope.

Figure 6:
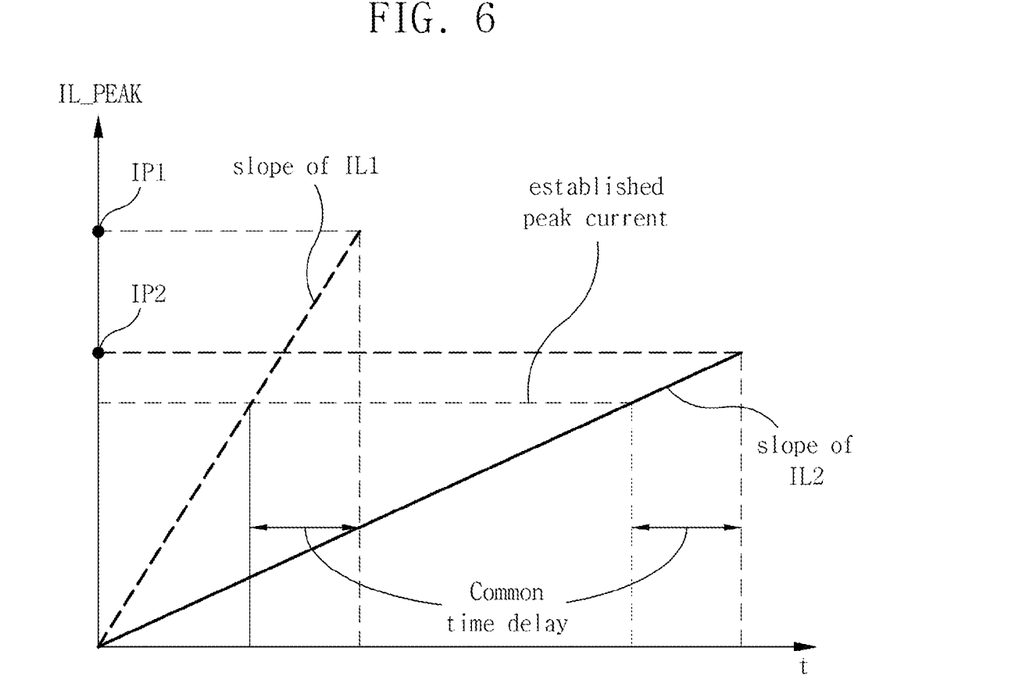
FIG. 6 is a graph illustrating magnitudes of inductor peak currents with respect to slopes of inductor currents in a conventional power converter.

FIG. 6 is a graph illustrating magnitudes of inductor peak currents with respect to slopes of inductor currents in a conventional power converter. Referring to FIG. 6, the peak current IP1 when a slope of the inductor current IL1 is steep may have a larger value than the peak current IP2 when a slope of the inductor current IL2 is gentle because of a common time delay such as a time required for a PMOS switching transistor, e.g. MP1 in FIG. 3, to be turned off and a time required for a bias supplied to the current sensor 1130 to be stabilized. That is, the magnitude of the inductor peak current may be significantly different from the magnitude of the established peak current.

Figure 7:
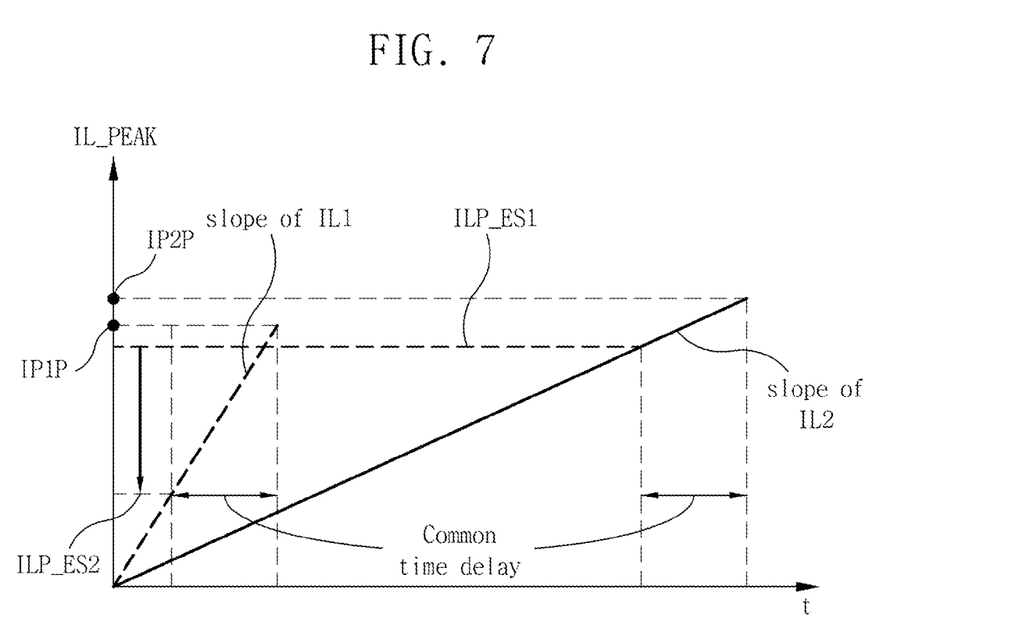
FIG. 7 is a graph illustrating magnitudes of inductor peak currents with respect to slopes of inductor currents in the power converter shown in FIG. 1 in accordance with example embodiments of the inventive concept.

FIG. 7 is a graph illustrating magnitudes of inductor peak currents with respect to slopes of inductor currents in the power converter 1000 shown in FIG. 1 in accordance with example embodiments of the inventive concept. Referring to FIG. 7, the power converter 1000 may have a first established peak current ILP_ES1 when a slope of the inductor current IL2 is gentle, and may have a second established peak current ILP_ES2 which has a smaller magnitude than the first established peak current ILP_ES1 when a slope of the inductor current IL1 is steep. Therefore, the peak current IP1P when a slope of the inductor current IL1 is steep may have a similar magnitude as the peak current IP2P when a slope of the inductor current IL2 is gentle, in power converter 1000 of FIG. 1.

Figure 8:
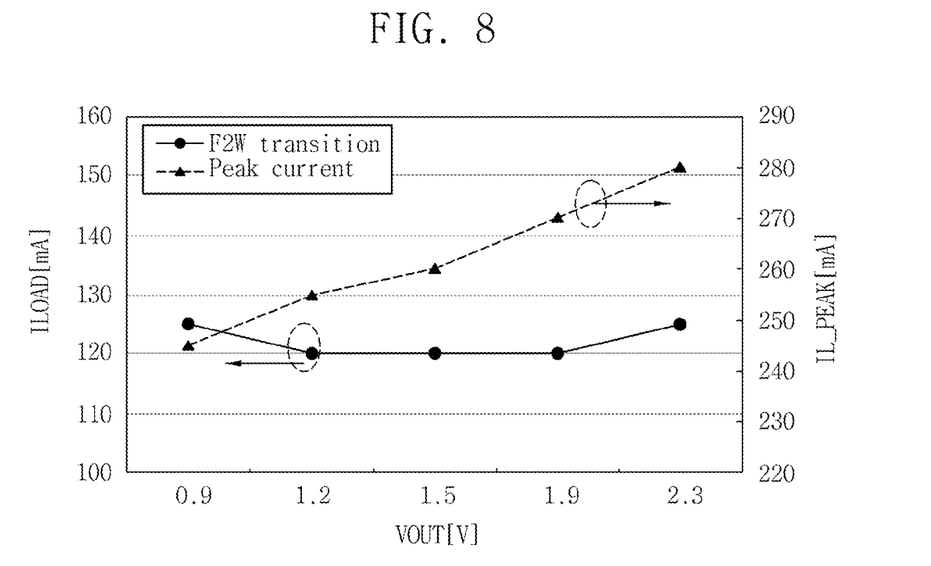
FIG. 8 is a graph illustrating inductor peak currents and load currents in which a transition between pulse-frequency-modulation (PFM) and pulse-width-modulation (PWM) is generated with respect to a change of a DC output voltage in the power converter shown in FIG. 1 in accordance with example embodiments of the inventive concept.

FIG. 8 is a graph illustrating inductor peak currents and load currents in which a transition between PFM and PWM is generated with respect to a change of a DC output voltage in the power converter 1000 shown in FIG. 1 in accordance with example embodiments of the inventive concept.

The power converter 1000 shown in FIG. 1 may operate in the pulse-frequency-modulation (PFM) mode when the magnitude of the load current ILOAD is small and in the pulse-width-modulation (PWM) mode when the magnitude of the load current ILOAD is large for the purpose of conversion efficiency.

Referring to FIG. 8, it is noted that a magnitude of the inductor peak current IL_PEAK increases as the DC output voltage VOUT increases. The reason is that the power converter 1000 in accordance with example embodiments of the inventive concept includes the current sensor 1130 having the structure shown in FIG. 4 to compensate the inductor peak current. If the inductor peak current is not compensated, the inductor peak current IL_PEAK may decrease as the DC output voltage VOUT increases. In the power converter 1000 in accordance with example embodiments of the inventive concept, the magnitude of the load current ILOAD in which a transition from the PFM mode to the PWM mode is generated is uniform even when the magnitude of the DC output voltage VOUT varies, because the magnitude of the inductor peak current IL_PEAK increases as the DC output voltage VOUT increases. The leftward pointing arrow indicates operation in the PFM mode, and the rightward pointing arrow indicates operation in the PWM mode. In the example embodiment of FIG. 8, the load current in which switching between the PFM and the PWM is performed may maintain a distribution lower than 5%.

Figure 9:
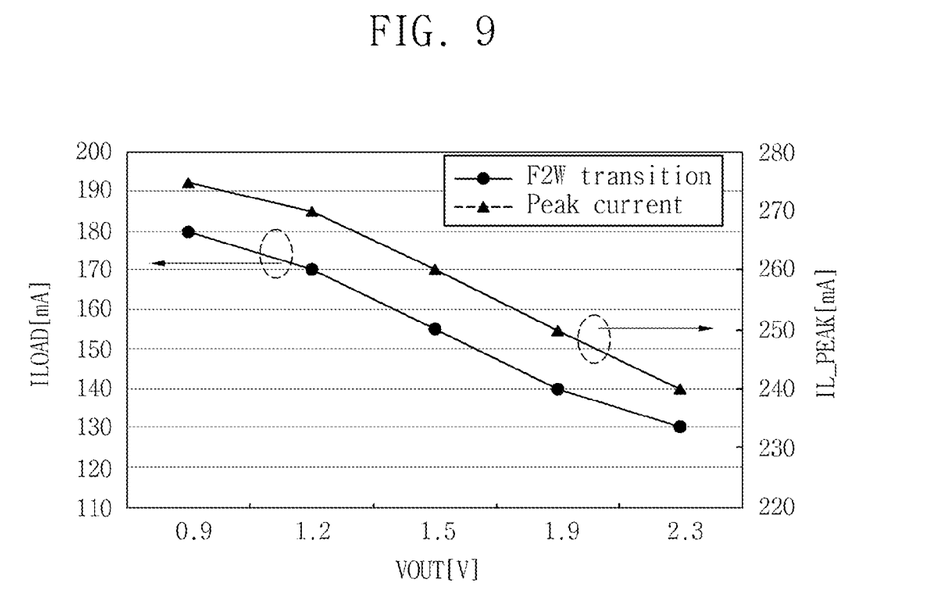
FIG. 9 is a graph illustrating inductor peak currents and load currents in which a transition between PFM and PWM is generated with respect to a change of a DC output voltage in a conventional power converter.

FIG. 9 is a graph illustrating inductor peak currents and load currents in which a transition between PFM and PWM is generated with respect to a change of a DC output voltage in a conventional power converter. Referring to FIG. 9, it is noted that a magnitude of the inductor peak current IL_PEAK decreases as the DC output voltage VOUT increases, because a current sensor of the conventional power converter does not include a function of compensating the inductor peak current. Therefore, in the conventional power converter, the magnitude of the load current ILOAD in which a transition from the PFM mode to the PWM mode is generated may be largely varied when the magnitude of the DC output voltage VOUT varies.

Figure 10:
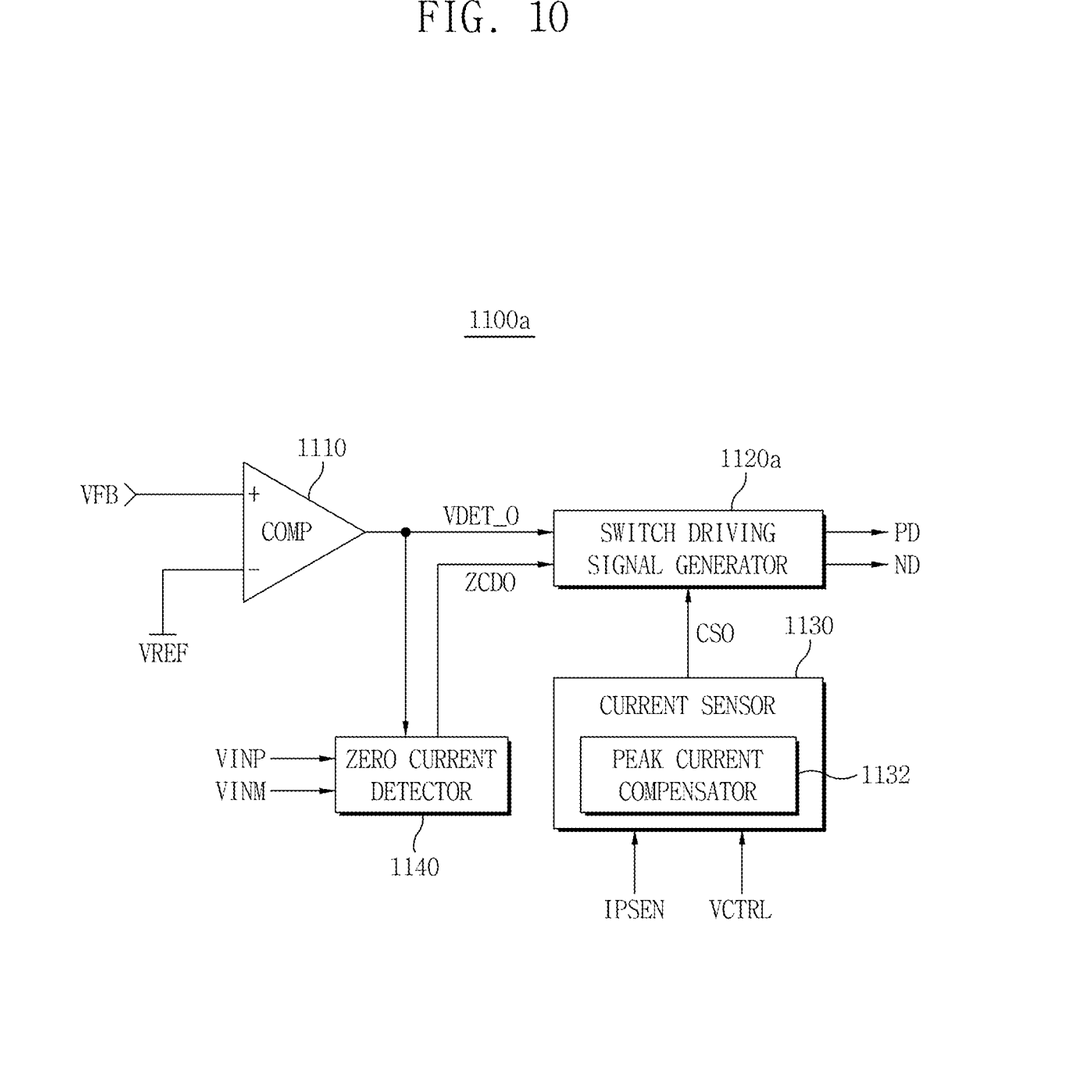
FIG. 10 is a circuit diagram illustrating a driving circuit of the power converter of FIG. 1, in accordance with another example embodiment of the inventive concept.

FIG. 10 is a circuit diagram illustrating a driving circuit 1100 of the power converter 1000 of FIG. 1, in accordance with another example embodiment of the inventive concept.

Referring to FIG. 10, the driving circuit 1100a includes a comparator 1110, a switch-driving signal generator 1120a, a current sensor 1130 and a zero-current detecting circuit 1140.

The comparator 1110 compares a feedback voltage VFB corresponding to the DC output voltage VOUT with a reference voltage VREF to generate a first detection voltage signal VDET_O. The zero-current detecting circuit 1140 compares a voltage signal VINP of a sensing node NS in FIG. 3 and a ground voltage VINM, generates a zero-current detecting signal ZCDO in response to the first detection voltage signal VDET_O, and provides the zero-current detecting signal ZCDO. The current sensor 1130 compensates for the inductor peak current and detects the compensated inductor peak current to generate a current-sensing output signal CSO based on the sensing current IPSEN and a control signal VCTRL. The switch-driving signal generator 1120a performs the PFM or the PWM based on the first detection voltage signal VDET_O, the current-sensing output signal CSO and the zero-current detecting signal ZCDO to generate the pull-up driving signal PD and the pull-down driving signal ND. The current sensor 1130 may include a peak-current compensating circuit 1132 that compensates for the inductor peak current.

Figure 11:
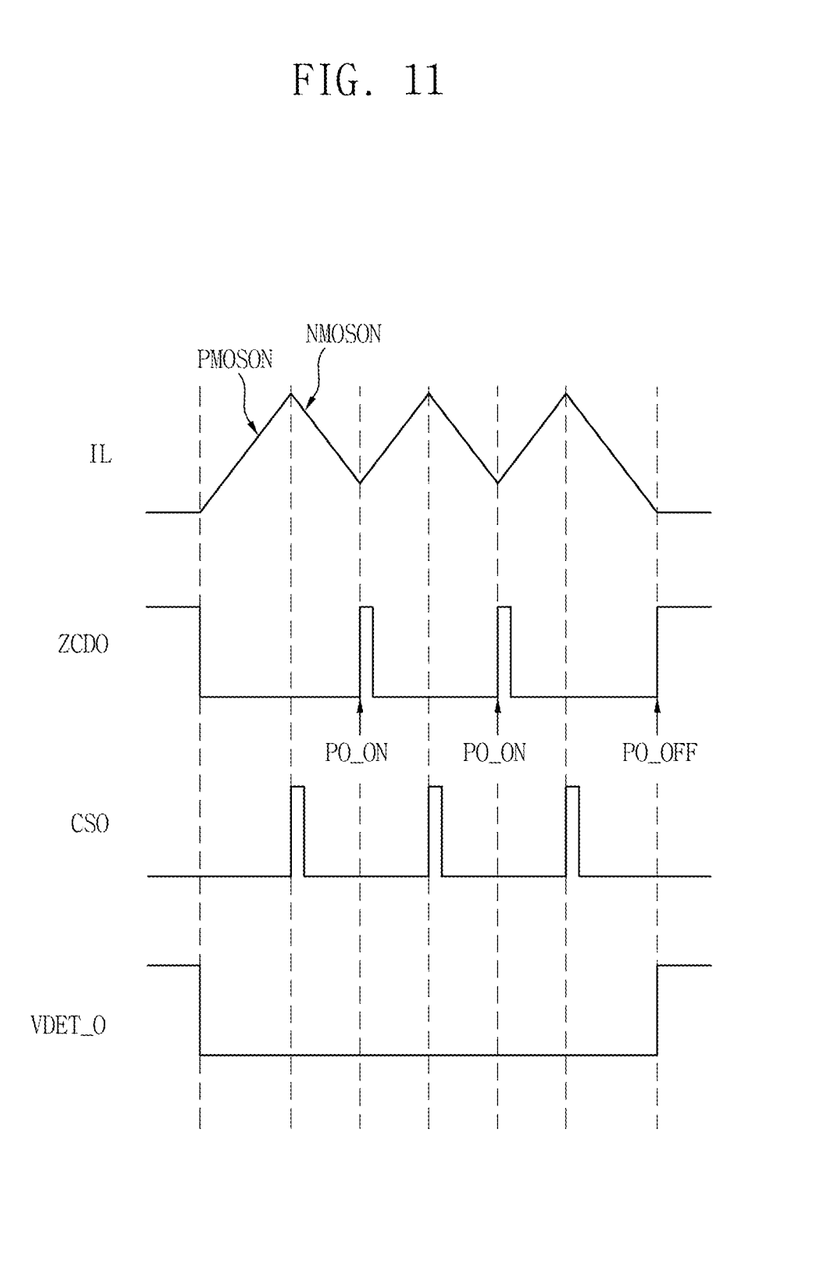
FIG. 11 is a timing diagram illustrating an operation of a power converter including the driving circuit of FIG. 10.

FIG. 11 is a timing diagram illustrating an operation of a power converter including the driving circuit 1100a of FIG. 10. In FIG. 11, IL denotes a current flowing through the inductor L, ZCDO denotes the zero-current detecting signal which is an output signal of the zero-current detecting circuit 1140, CSO denotes the current-sensing output signal which is an output signal of the current sensor 1130, and VDET_O denotes the first detection voltage signal which is an output signal of the comparator 1110.

Referring to FIG. 11, the inductor current IL flowing through the inductor IL increases and decreases repeatedly according to a switching operation of the pull-up transistor MP1 in FIG. 3 and the pull-down transistor MN1 in FIG. 3. For example, the inductor current IL in FIG. 3 may have a positive slope at PMOSON when the pull-up transistor MP1 is in the on state and the pull-down transistor MN1 is in the off state, and may have a negative slope at NMOSON when the pull-up transistor MP1 is in the off state and the pull-down transistor MN1 is in the on state. The positive slope is proportional to a difference between the DC input voltage VIN and the DC output voltage VOUT, and the negative slope is proportional to the magnitude of the DC output voltage VOUT.

The inductor current IL changes from the positive slope to the negative slope in response to a pulse of the current-sensing output signal CSO corresponding to a peak current of the inductor L. Further, the inductor current IL changes from the negative slope to the positive slope in response to a pulse of the zero-current detecting signal ZCDO generated when a magnitude of a current flowing through the inductor L is zero. However, the zero-current detecting circuit 1140 of the power converter 1000 in accordance with example embodiments of the inventive concept has an offset voltage, and therefore generates the zero-current detecting signal ZCDO to change the inductor current IL from the negative slope to the positive slope before the inductor current IL becomes zero. When a voltage of the output node NO of the power converting unit 1200 is lower than the reference voltage VREF, the first detection voltage signal VDET_O has a logic low state, and the zero-current detecting circuit 1140 provides an additional driving current to the output node NO in FIG. 3. Therefore, the zero-current detecting signal ZCDO is generated before the inductor current IL becomes zero. When the first detection voltage signal VDET_O is in a logic high state, the zero-current detecting circuit 1140 does not have an offset voltage.

Figure 12:
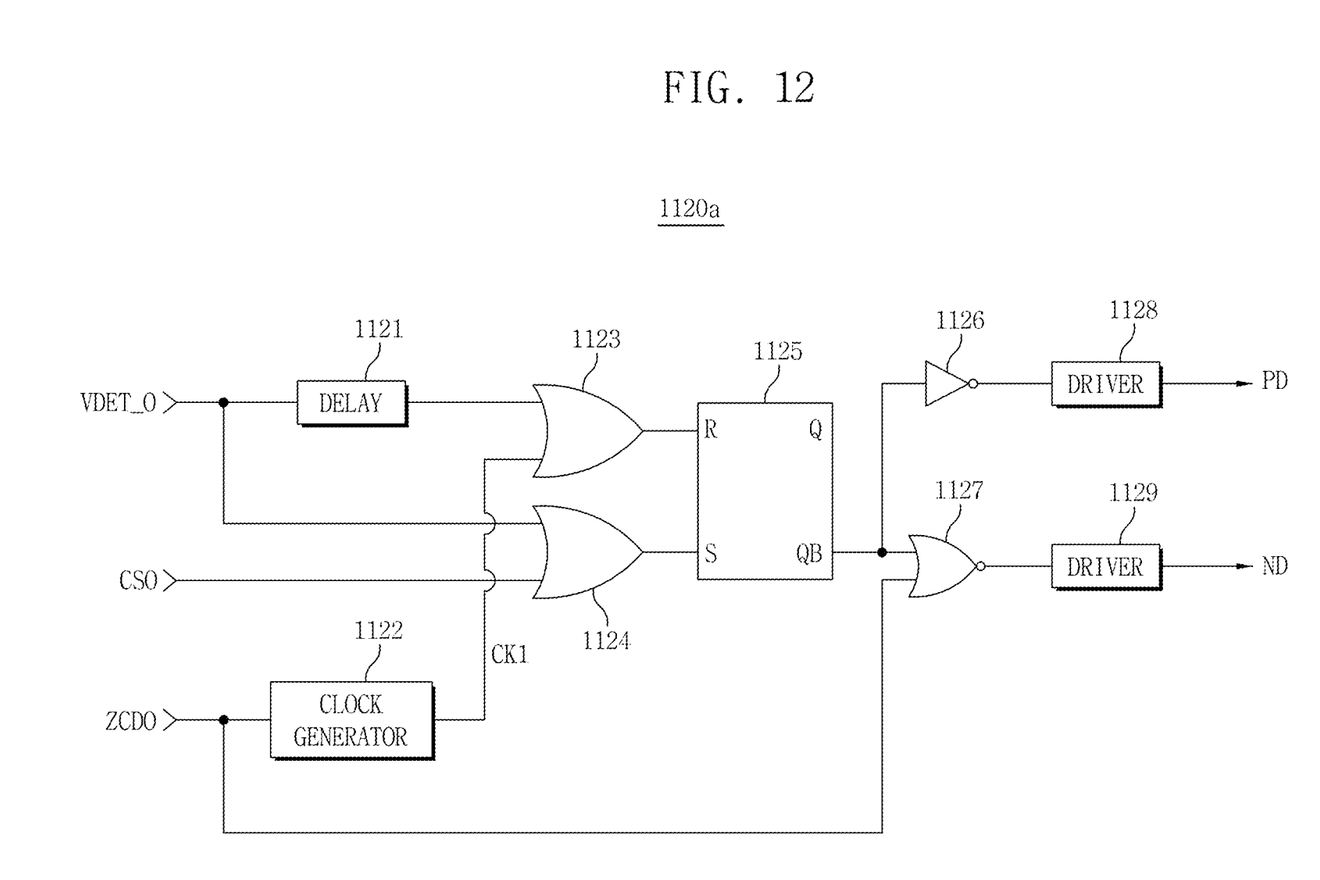
FIG. 12 is a circuit diagram illustrating a switch-driving signal generator included in the driving circuit of FIG. 10, in accordance with an example embodiment of the inventive concept.

FIG. 12 is a circuit diagram illustrating a switch-driving signal generator 1120a included in the driving circuit of FIG. 10, in accordance with an example embodiment of the inventive concept.

Referring to FIG. 12, the switch-driving signal generator 1120a may include a delay circuit 1121, a clock generator 1122, a first OR circuit 1123, a second OR circuit 1124, a latch circuit 1125, an inverter 1126, an NOR circuit 1127, a first driver 1128 and a second driver 1129.

The delay circuit 1121 delays the first detection voltage signal VDET_O, and the clock generator 1122 generates a clock signal CK1 based on the zero-current detecting signal ZCDO. The first OR circuit 1123 performs a logical OR operation on an output signal of the delay circuit 1121 and the clock signal CK1. The second OR circuit 1124 performs a logical OR operation on the first detection voltage signal VDET_O and the current-sensing output signal CSO. The latch circuit 1125 may be configured of a RS flip flop and latches an output signal of the first OR circuit 1123 and an output signal of the second OR circuit 1124. The NOR circuit 1127 performs a logical NOR operation on an output signal of the latch circuit 1125 and the zero-current detecting signal ZCDO. The inverter 1126 inverts a phase of the output signal of the latch circuit 1125. The first driver 1128 generates the pull-up driving signal PD in response to an output signal of the inverter 1126. The second driver 1129 generates the pull-down driving signal ND in response to an output signal of the NOR circuit 1127.

Hereinafter, the operation of the switch-driving signal generator 1120a shown in FIG. 12 will be described.

When the first detection voltage signal VDET_O is in a logic low state, the switch-driving signal generator 1120a activates the first driver 1128 to enable the pull-up driving signal PD and deactivates the second driver 1129 to disable the pull-down driving signal ND. Therefore, the pull-up transistor MP1 in FIG. 3 is turned on and the pull-down transistor MN1 in FIG. 3 is turned off. Accordingly, the inductor current IL increases and the DC output voltage VOUT increases.

When the first detection voltage signal VDET_O is in a logic high state, the switch-driving signal generator 1120a deactivates the first driver 1128 to disable the pull-up driving signal PD and activates the second driver 1129 to enable the pull-down driving signal ND. Therefore, the pull-up transistor MP1 in FIG. 3 is turned off and the pull-down transistor MN1 in FIG. 3 is turned on. Accordingly, the inductor current IL decreases and the DC output voltage VOUT decreases.

When the current-sensing output signal CSO generated based on the peak current of the inductor IL is enabled, the first driver 1128 is deactivated and the pull-up driving signal PD is disabled, and the second driver 1129 is activated and the pull-down driving signal ND is enabled. Therefore, the pull-up transistor MP1 in FIG. 3 is turned off and the pull-down transistor MN1 in FIG. 3 is turned on.

When the zero-current detecting signal ZCDO generated based on a zero current of the inductor L is enabled, the switch-driving signal generator 1120a activates the first driver 1128 to enable the pull-up driving signal PD and deactivates the second driver 1129 to disable the pull-down driving signal ND. Therefore, the pull-up transistor MP1 in FIG. 3 is turned on and the pull-down transistor MN1 in FIG. 3 is turned off. Accordingly, the inductor current IL increases and the DC output voltage VOUT increases.

As described above, the power converter 1000 in accordance with example embodiments of the inventive concept may operate in the PFM mode when the magnitude of the load current ILOAD is small and in the PWM mode when the magnitude of the load current ILOAD is large, for the purpose of conversion efficiency.

Figure 13:
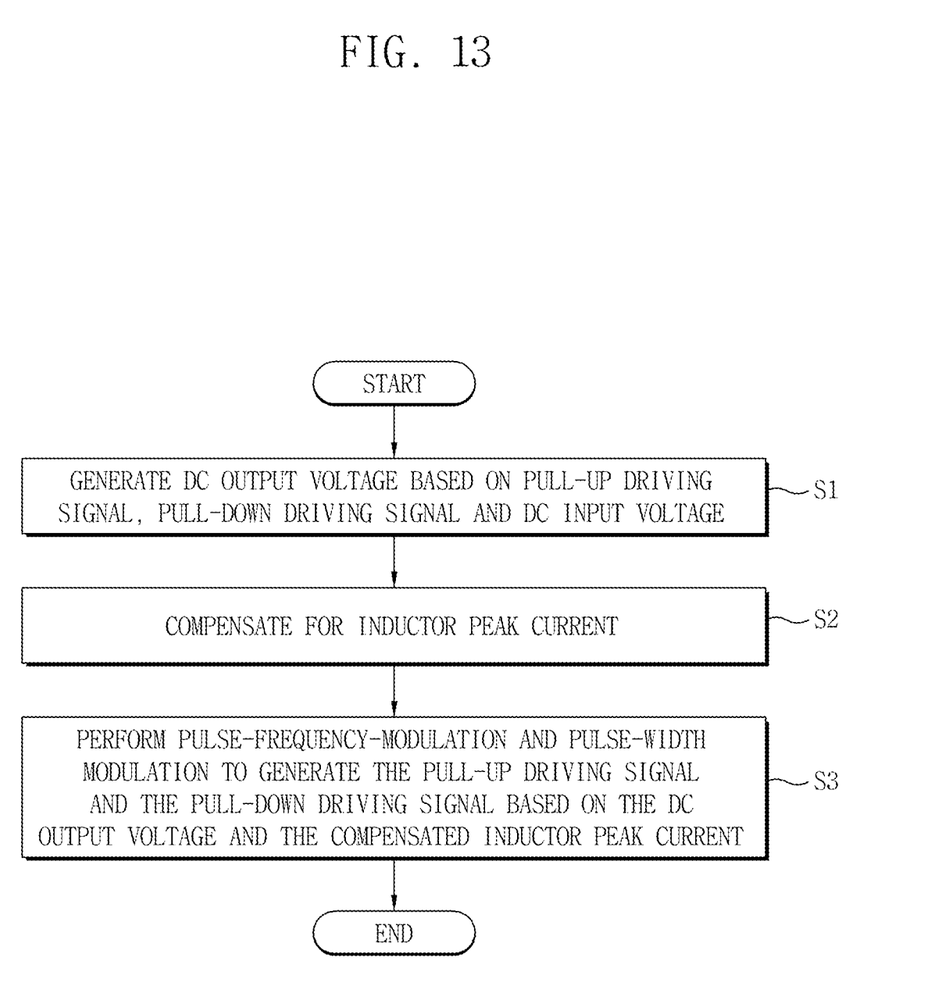
FIG. 13 is a flowchart illustrating a method of power conversion in accordance with example embodiments of the inventive concept.

FIG. 13 is a flowchart illustrating a method of power conversion in accordance with example embodiments of the inventive concept.

Referring to FIG. 13, the method of power conversion in accordance with example embodiments of the inventive concept includes the following operations of:

1) generating a DC output voltage based on a pull-up driving signal, a pull-down driving signal and a DC input voltage (S1);

2) compensating for an inductor peak current (S2); and 3) performing a PFM and a PWM to generate the pull-up driving signal and the pull-down driving signal based on the DC output voltage and the compensated inductor peak current (S3).

Figure 14:
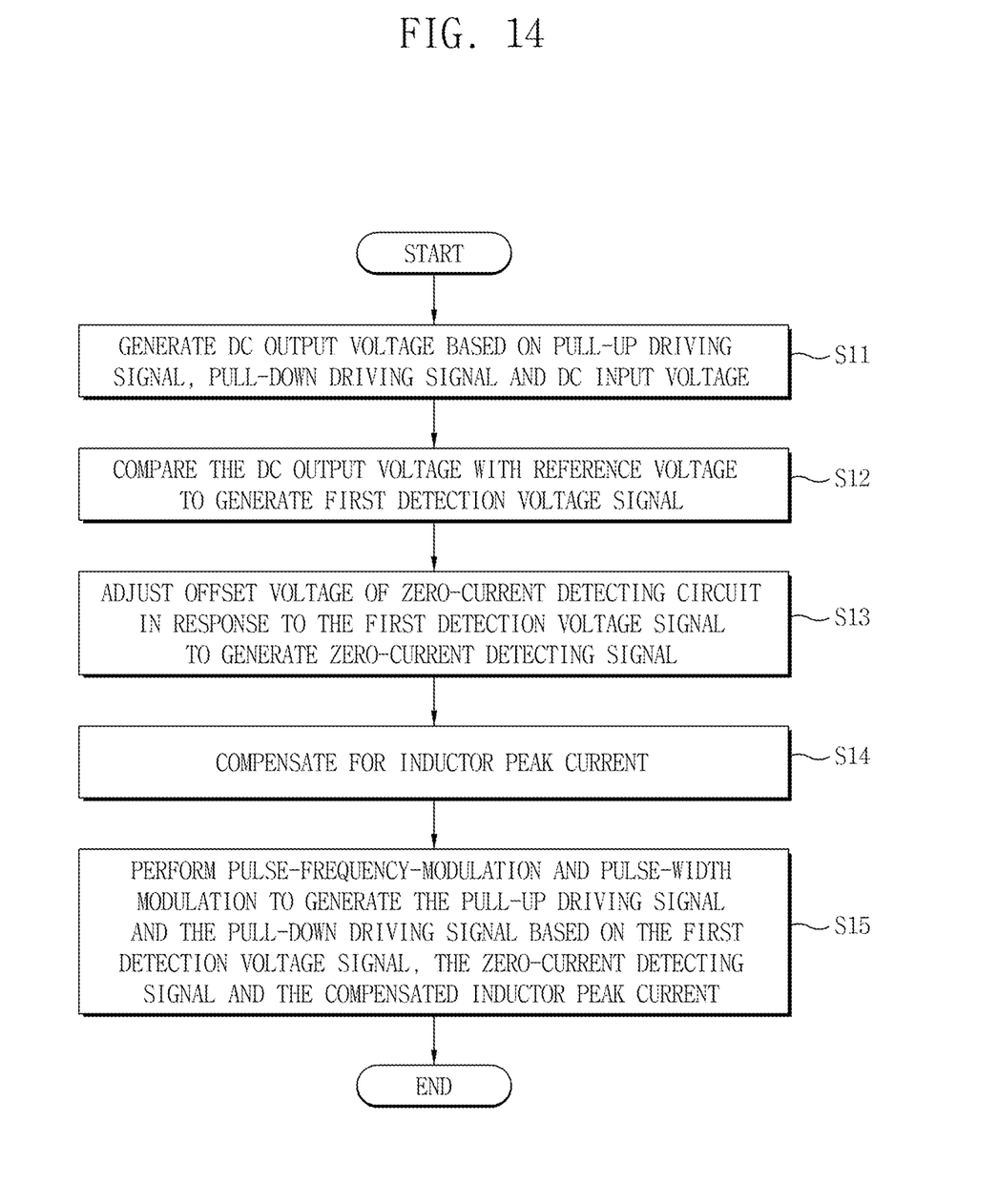
FIG. 14 is a flowchart illustrating a method of power conversion in accordance with example embodiments of the inventive concept.

FIG. 14 is a flowchart illustrating another method of power conversion in accordance with example embodiments of the inventive concept.

Referring to FIG. 14, the method of power conversion in accordance with example embodiments of the inventive concept includes the following operations of:

1) generating a DC output voltage based on a pull-up driving signal, a pull-down driving signal and a DC input voltage (S11);

2) comparing the DC output voltage with a reference voltage to generate a first detection voltage signal (S12);

3) adjusting an offset voltage of a zero-current detecting circuit in response to the first detection voltage signal to generate a zero-current detecting signal (S13);

4) compensating for an inductor peak current (S14); and 5) performing a PFM and a PWM to generate the pull-up driving signal and the pull-down driving signal based on the first detection voltage signal, the zero-current detection signal, and the compensated inductor peak current (S15).

The power converter 1000 in accordance with example embodiments of the inventive concept functions to compensate for a peak current, and therefore the magnitude of the load current ILOAD in which a transition from the PFM mode to the PWM mode is generated is uniform even when the magnitude of the DC output voltage VOUT varies.

In the above, a step-down converter including a current sensor that has a function of peak current compensation is described. However, the above noted concepts may also be applied to a boost converter and a buck-boost converter.

The foregoing is illustrative of embodiments and is not to be construed as limiting thereof. Although a few embodiments have been described, those skilled in the art will readily appreciate that many modifications are possible in embodiments without materially departing from the novel teachings and advantages. Accordingly, all such modifications are intended to be included within the scope of this inventive concept as defined in the claims. In the claims, means-plus-function clauses are intended to cover the structures described herein as performing the recited function, and not only structural equivalents but also equivalent structures. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A power converter comprising:
    a power converting unit configured to generate an inductor peak current and a DC output voltage responsive to the inductor peak current, based on a pull-up driving signal, a pull-down driving signal and a DC input voltage;
    a zero-current detecting circuit configured to compare a voltage signal of a sensing node within the power converting unit and a ground voltage to generate a zero-current detecting signal in response to a first detection voltage signal; and
    a driving circuit configured to compensate for the inductor peak current, and perform in a pulse-frequency-modulation (PFM) mode and a pulse-width-modulation (PWM) mode to generate the pull-up driving signal and the pull-down driving signal based on the DC output voltage, the zero-current detecting signal and the compensated inductor peak current, the driving circuit comprising
        a comparator configured to compare the DC output voltage with a reference voltage to generate the first detection voltage signal,
        a current sensor configured to compensate for the inductor peak current and detect the compensated inductor peak current to generate a current-sensing output signal, and
        a switch-driving-signal generator configured to perform in the PFM mode or the PWM mode based on the first detection voltage signal, the zero-current detecting signal and the current-sensing output signal, to generate the pull-up driving signal and the pull-down driving signal.

2. The power converter of claim 1, wherein the power converter is configured to operate in the PFM mode when the inductor peak current is lower than a first current value and operate in the PWM mode when the inductor peak current is higher than the first current value.

3. The power converter of claim 1, wherein the driving circuit is configured to perform switching between the PFM mode and the PWM mode at a uniform load current.

4. The power converter of claim 1, wherein the uniform load current in which switching between the PFM mode and the PWM mode is performed is maintained as having a distribution lower than 5%.

5. The power converter of claim 1, wherein the current sensor includes a peak-current compensating circuit that compensates for the inductor peak current.

6. The power converter of claim 1, wherein the zero-current detecting signal indicates a time point at which a pull-up transistor of the power converting unit is turned on.

7. The power converter of claim 1, wherein the zero-current detecting signal indicates a time point at which a pull-down transistor of the power converting unit is turned off.

8. The power converter of claim 1, wherein the switch-driving-signal generator comprises:
    a delay circuit configured to delay the first detection voltage signal;
    a clock generator configured to generate a clock signal based on the zero-current detecting signal;
    a first OR circuit configured to perform a logical OR operation on an output signal of the delay circuit and the clock signal;
    a second OR circuit configured to perform a logical OR operation on the first detection voltage signal and the current-sensing output signal;
    a latch circuit configured to latch an output signal of the first OR circuit and an output signal of the second OR circuit;
    an NOR circuit configured to perform a logical NOR operation on an output signal of the latch circuit and the zero-current detecting signal;
    an inverter configured to invert a phase of the output signal of the latch circuit;
    a first driver configured to generate the pull-up driving signal in response to an output signal of the inverter; and
    a second driver configured to generate the pull-down driving signal in response to an output signal of the NOR circuit.

9. The power converter of claim 1, wherein the power converting unit comprises:
    a first PMOS transistor having a source connected to the DC input voltage, a gate connected to the pull-up driving signal, and a drain connected to a sensing node;
    a first NMOS transistor having a drain connected to the sensing node, a gate connected to the pull-down driving signal, and a source connected to ground;
    a second PMOS transistor having a source connected to the DC input voltage, a gate connected to the pull-up driving signal, and a drain from which a first sensing current is output;
    an inductor coupled between the sensing node and an output node; and
    a capacitor coupled between the output node and ground.

10. The power converter of claim 9, wherein a second sensing current is output from the sensing node.

11. The power converter of claim 9, wherein the current sensor comprises:
    a peak-current sensor configured to generate a first peak-current detecting signal based on the first sensing current and a second sensing current output from the sensing node;
    a peak-current compensating circuit configured to subtract a peak-current compensating signal from the first peak-current detecting signal to generate a second peak-current detecting signal in response to a control signal; and
    a buffer circuit configured to generate the current-sensing output signal based on the second peak-current detecting signal.

12. The power converter of claim 11, wherein the control signal comprises a plurality of bits generated based on a voltage level of the DC output voltage.

13. The power converter of claim 11, wherein the peak-current compensating circuit includes a plurality of transistors coupled between an output node of the peak-current sensor and ground, and is configured to perform a switching operation in response to the control signal, the control signal having a plurality of bits.

14. The power converter of claim 11, wherein the control signal comprises a plurality of bits, the peak-current compensating circuit includes a plurality of current paths, and each of the current paths comprises:
- a first MOS transistor having a source connected to ground and a gate connected to a bias voltage; and
- a second MOS transistor having a drain connected to an output node of the peak-current sensor, a gate connected to one of the plurality of bits of the control signal, and a source connected to a drain of the first MOS transistor.

15. A power converter comprising:
- a power converter unit configured to receive an input voltage and to generate an inductor peak current and an output voltage responsive to a pull-up driving signal and a pull-down driving signal;
- a current sensor connected to the power converter unit and configured to provide a first peak current detection signal responsive to a sensed current from the power converter unit, a compensated inductor peak current responsive to a level of the output voltage, and a second peak current detection signal responsive to the first peak current detection signal and the compensated inductor peak current;
- a comparator configured to generate a first detection voltage signal responsive to comparison of a reference voltage to a feedback voltage corresponding to the output voltage; and
- a switch driving signal generator configured to generate the pull-up driving signal and the pull-down driving signal responsive to the first detection voltage signal and the second peak current detection signal,
- wherein the switch driving signal generator is configured to perform switching between a pulse-frequency-modulation (PFM) mode and a pulse-width-modulation (PWM) mode at a uniform load current responsive to the first detecting voltage signal and the second current detection signal.

16. The power converter of claim 15, further comprising:
- a zero-current detecting circuit configured to compare a voltage signal from a sensing node within the power converting unit and a ground voltage, and to generate a zero-current detecting signal responsive to the first detection voltage signal and the comparison,
- the switch driving signal generator configured to generate the pull-up driving signal and the pull-down driving signal further responsive to the zero-current detecting signal.

17. The power converter of claim 16, wherein an offset voltage of the zero-current detecting current is adjusted responsive to the first detection voltage signal to generate the zero-current detecting signal.

* * * * *